United States Patent [19]
Yamazaki

[11] Patent Number: 6,115,097
[45] Date of Patent: Sep. 5, 2000

[54] LIQUID CRYSTAL DEVICE WITH LIGHT BLOCKING SEALING MEMBER AND LIGHT BLOCKING ELECTRODE OVER TWO INTERLAYER INSULATING FILMS

[75] Inventor: Shunpei Yamazaki, Tokyo, Japan

[73] Assignee: Semiconductor Energy Laboratory Co., Ltd, Kanagawa-ken, Japan

[21] Appl. No.: 08/854,304

[22] Filed: May 12, 1997

[30] Foreign Application Priority Data

May 16, 1996 [JP] Japan ................................ 8-146668

[51] Int. Cl.$^7$ ................................ G02F 1/1345
[52] U.S. Cl. .................... 349/151; 349/153; 349/138; 349/111
[58] Field of Search ............. 349/151, 143, 349/153, 138, 111

[56] References Cited

U.S. PATENT DOCUMENTS 5,148,301  9/1992  Sawatsubashi et al. ............. 349/153
5,155,612  10/1992  Adachi et al. .................... 349/153
5,250,931  10/1993  Misawa et al. ................... 349/151

FOREIGN PATENT DOCUMENTS 2-242230  9/1990  Japan ............................ 349/143
7-92475  of 1995  Japan .

*Primary Examiner*—Kenneth Parker
*Attorney, Agent, or Firm*—Fish & Richardson P.C.

[57] ABSTRACT

An active matrix type liquid crystal device with a peripheral driver circuit. The peripheral driver is formed inside an area surrounded by a sealing member. That sealing member bonds together a pair of glass substrates and seals liquid crystal material therein. The peripheral driver circuit is covered with the sealing material enabling the entire device to be reduced in size. The sealing member can also have a light blocking function to avoid the need for a separate light blocking film.

27 Claims, 9 Drawing Sheets

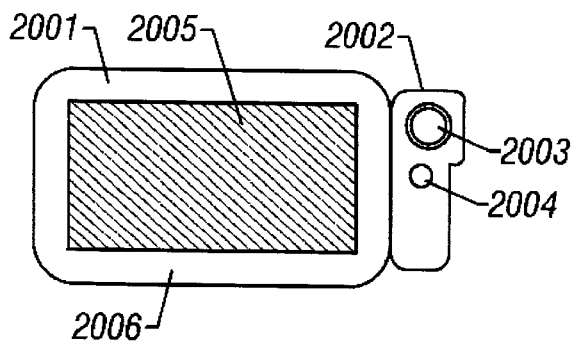
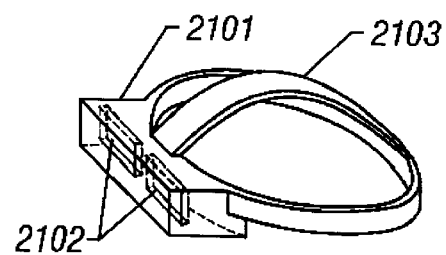
FIG. 11A
FIG. 11B
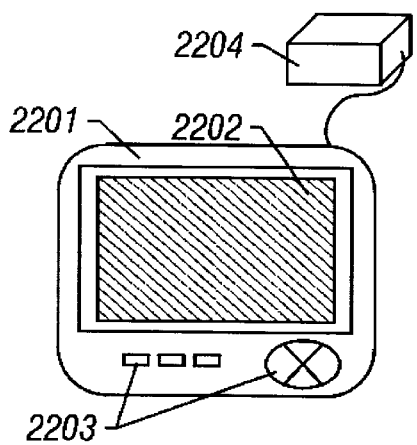
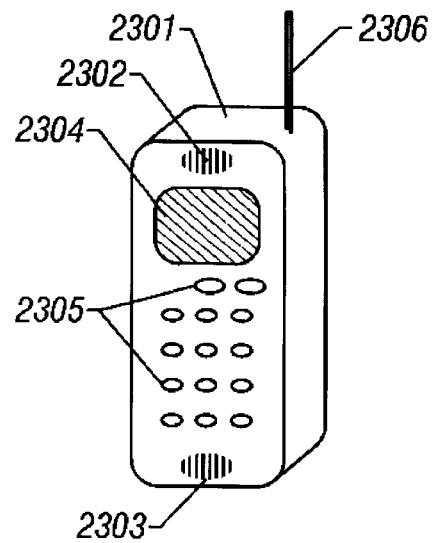
FIG. 11C
FIG. 11D
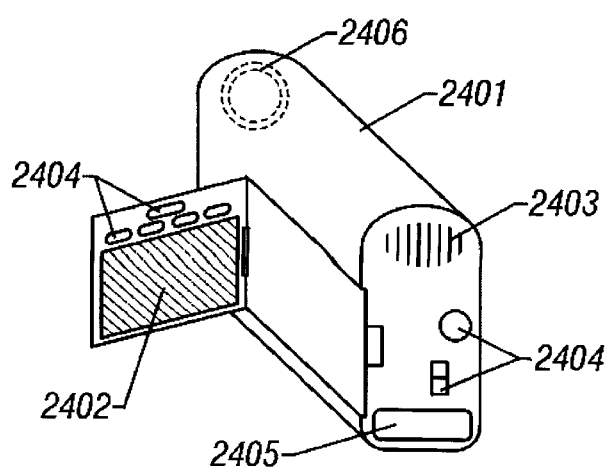
FIG. 11E

LIQUID CRYSTAL DEVICE WITH LIGHT BLOCKING SEALING MEMBER AND LIGHT BLOCKING ELECTRODE OVER TWO INTERLAYER INSULATING FILMS

BACKGROUND OF THE INVENTION

1. Field of the Invention

The present invention relates to an active matrix liquid crystal display device.

2. Description of the Related Art

In recent years, active matrix liquid crystal display devices have attracted much attention. In the active matrix display devices, a thin-film transistor is provided for each of pixel electrodes that are arranged in matrix form. The thin-film transistor, which is provided for each pixel, has a function of controlling charge entering/exiting from the associated pixel electrode.

The thin-film transistors are formed by using a silicon thin film that is formed on a glass or quartz substrate. Although at present an amorphous silicon film is mainly used as the silicon thin film, it is now expected that in the future a silicon film having crystallinity (called a crystalline silicon film) will become the mainstream.

The crystalline silicon film is defined as a silicon film whose crystal structure is more orderly than an amorphous silicon film. Examples of the crystalline silicon film are a polycrystal silicon film and a microcrystal silicon film.

Forming an active matrix liquid crystal display device by using a crystalline silicon film is advantageous in that not only an active matrix circuit but also peripheral driver circuits can be integrated on the same substrate. This is because the use of a crystalline silicon film allows p-channel thin-film transistors to become suitable for practical use (i.e., allows formation of CMOS transistors) as well as provides thin-film transistors capable of operating at several megahertz (the peripheral driver circuits are required to operate at several megahertz).

Active matrix liquid crystal display devices having the above configuration are now required to be manufactured at lower costs. To this end, the configuration needs to be simplified.

On the other hand, it is also required that the overall size of the device be made smaller. This requirement should be satisfied when a liquid crystal display device is used as a display of portable video cameras and portable business equipment, and further of various types of information terminal equipment. That is, the portable video cameras and the portable business equipment are required to be reduced in size, and accordingly the display itself is also required to be made as small (or light) as possible.

SUMMARY OF THE INVENTION

An object of the present invention is to simplify the configuration of an active matrix liquid crystal display device, and to reduce its overall size.

According to the invention, there is provided a display device comprising a pair of substrates; a liquid crystal interposed between the pair of substrates; an active matrix circuit and a peripheral driver circuit provided on one of the pair of substrates; and a sealing member so disposed as to seal the liquid crystal and cover the peripheral driver circuit, the sealing member being capable of light blocking.

In the above configuration, the active matrix circuit may have pixels that are arranged in matrix form, and regions in each of the pixels where source lines and drain lines coextend with a pixel electrode may serve as a black matrix.

In the above configuration, an electrode or a wiring line connected to a source or drain of a thin-film transistor provided in the active matrix circuit may be one of a metal film, a semiconductor film, and a silicide film, and a light blocking film for the thin-film transistor may be formed by using the one of the metal film, the semiconductor film, and the silicide film.

In the above configuration, the pair of substrates may be glass substrates or quartz substrates.

In the above configuration, the pair of substrates may be bonded to each other with the sealing member.

More specifically, referring to FIG. 6, a liquid crystal material 439 is interposed between and held by a pair of substrates 434 and 401 and sealed by a sealing member 437. An active matrix circuit 440 and a peripheral driver circuit 441 are provided on the substrate 401. The peripheral driver circuit 441 is covered with the sealing member 437 capable of light blocking. That is, the peripheral driver circuit 441 is shielded from light by the sealing member 437.

BRIEF DESCRIPTION OF THE DRAWINGS

FIGS. 11A–11E show examples of electronic devices according to fourth embodiment of the invention.

DETAILED DESCRIPTION OF THE PREFERRED EMBODIMENTS

Embodiment 1

Figure 1:
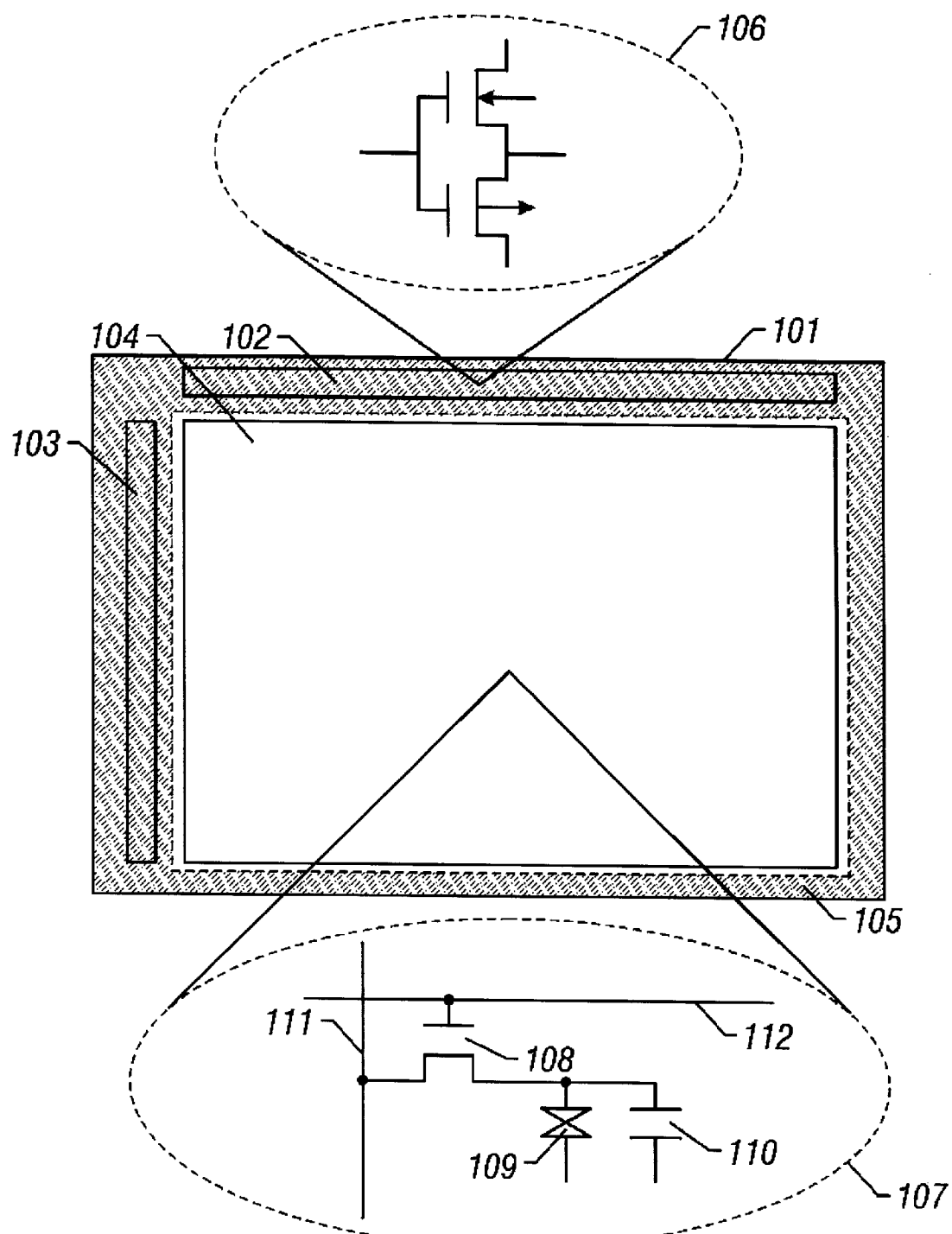
FIG. 1 outlines an active matrix type liquid crystal display device according to a first embodiment of the present invention.

FIG. 1 outlines an active matrix liquid crystal panel (liquid crystal display device) 101 which incorporates peripheral driver circuits as integral components.

In FIG. 1, reference numeral 104 denotes an active matrix circuit, in which pixels are arranged in matrix form.

Each pixel 107 is constructed as shown in FIG. 1. That is, each pixel 107 is provided with a thin-film transistor 108 to which a gate line 112 and a source line 111 are connected. Gate lines and source lines are arranged in lattice form in the active matrix area, and pixels are provided in the vicinity of the respective intersections of those lines.

A pixel electrode is connected to the drain of the thin-film transistor 108, and an electric field is applied to a liquid crystal 109 from the pixel electrode. An auxiliary capacitor 110 is connected in parallel to the liquid crystal 109, to compensate for its charge holding characteristic.

Peripheral driver circuits 102 and 103 are configured by using shift registers. Naturally they may be configured in a different manner. More specifically, reference numerals 102 and 103 in FIG. 1 denote a source driver circuit and a gate driver circuit, respectively.

Figure 2:
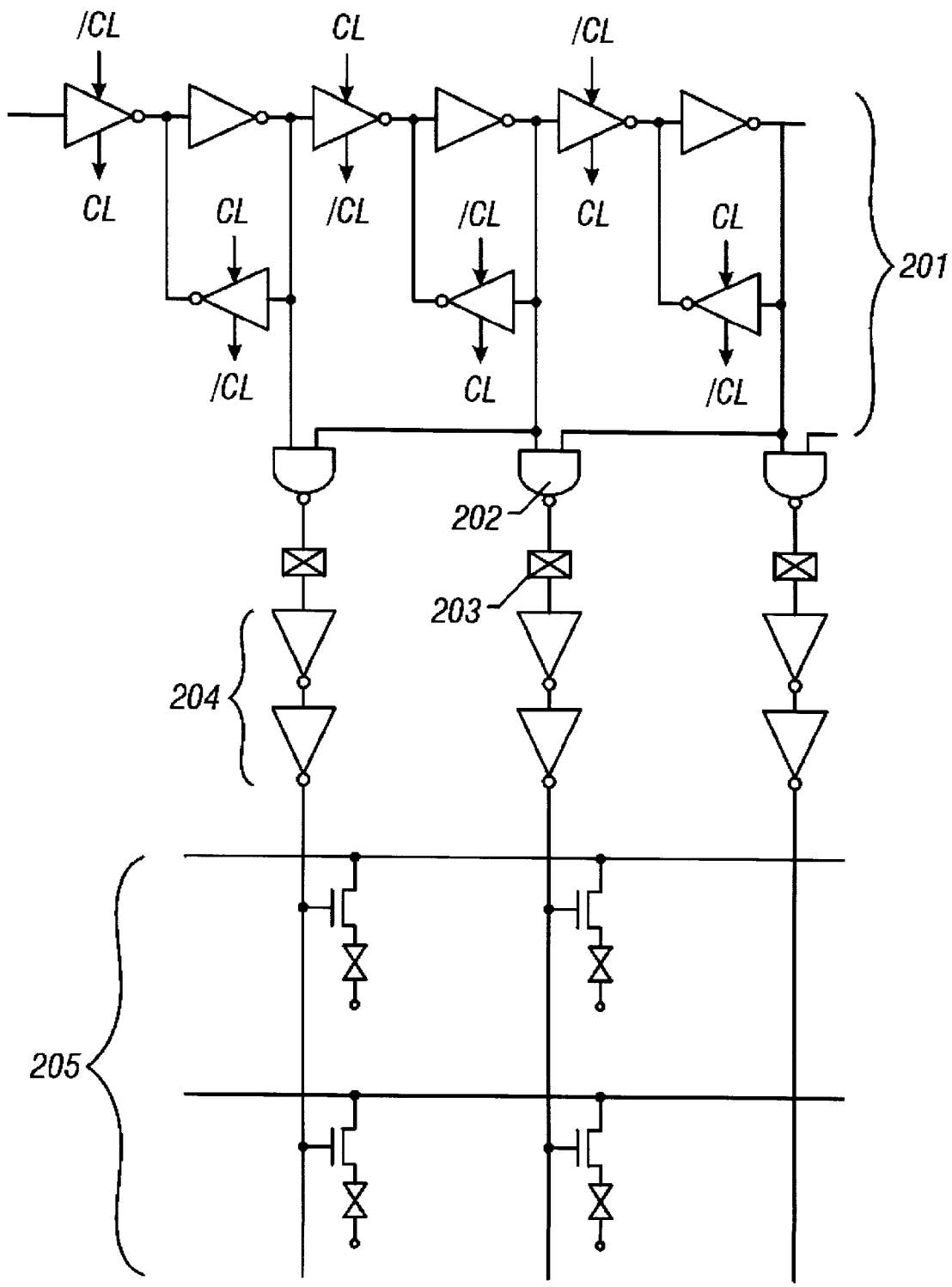
FIG. 2 shows a circuit configuration of a gate driver used in the active matrix type liquid crystal display device of FIG. 1.
Figure 3A:
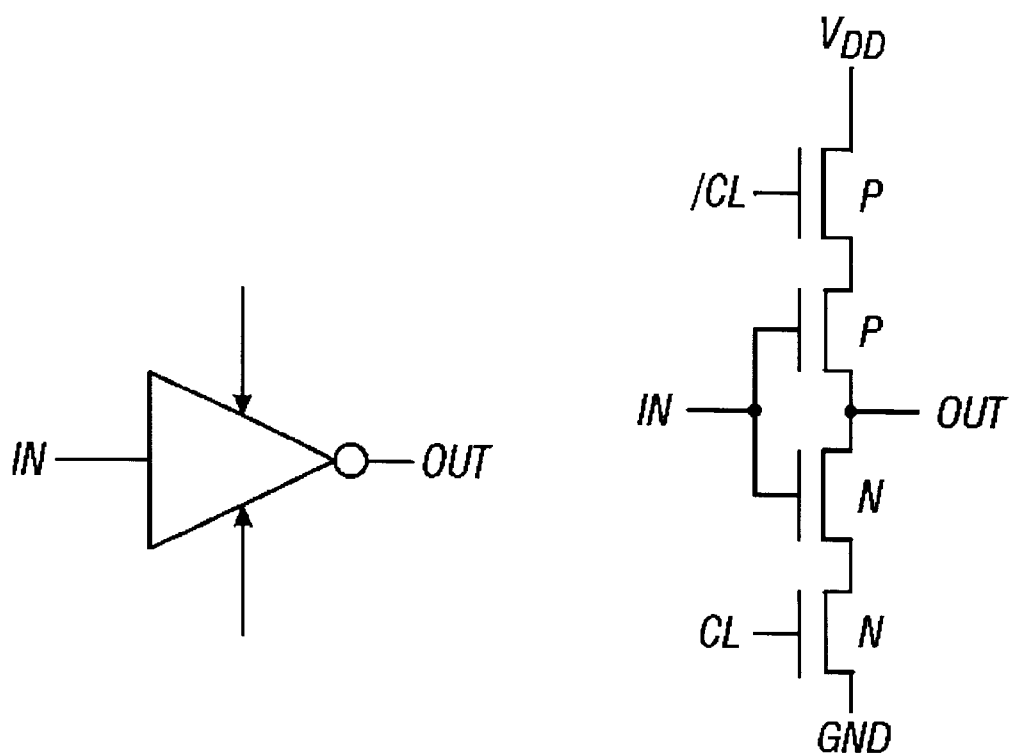
FIGS. 3A and 3B show circuits that constitute a shift register circuit used in the gate driver of FIG. 2.
Figure 3B:
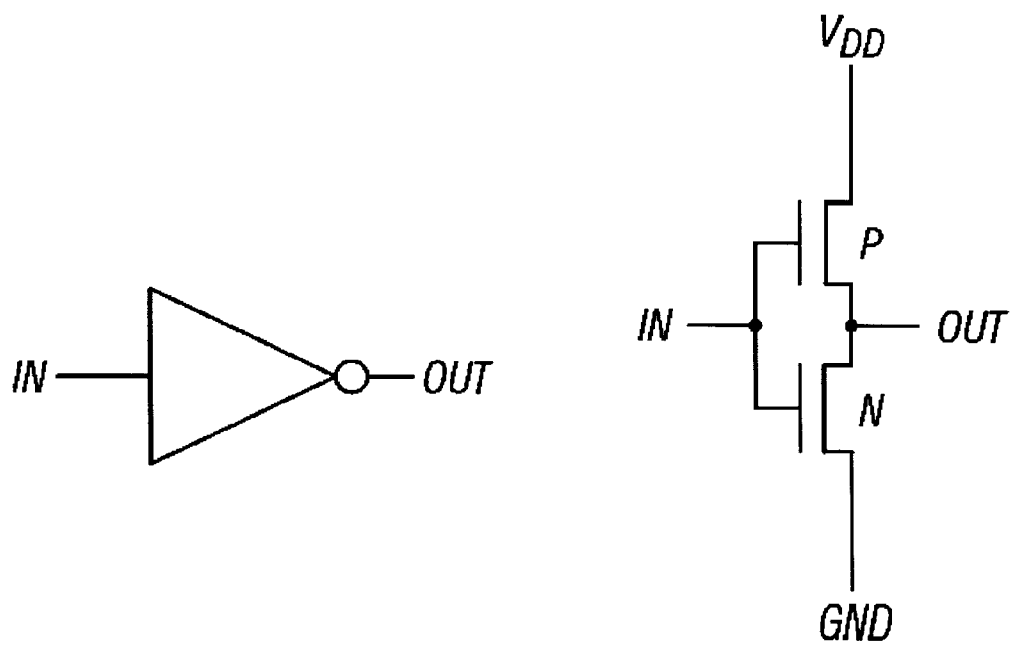

FIG. 2 shows an example of the configuration of the gate driver circuits 103 for supplying drive signals to the gate lines, which is a part of the peripheral driver circuit. In FIG. 2, reference numeral 201 denotes a shift register circuit. Each unit circuit of the shift register 201 is a clocked inverter (FIG. 3A) or an inverter (FIG. 3B). Further, in FIG. 2, reference numeral 202 denotes a NAND circuit; 203, a level shifter; 204, a buffer circuit for providing a necessary driving ability; and 205, an active matrix circuit.

Returning to FIG. 1, reference numeral 106 denotes an inverter circuit as the most fundamental circuit that constitutes the peripheral driver circuits 102 and 103.

In FIG. 1, reference numeral 105 denotes an area where a resin member for sealing exists. This sealing member serves to bond together a pair of glass substrates (or quartz substrates; not apparent from FIG. 1) as well as to prevent an inside liquid crystal from leaking out. The peripheral driver circuits 102 and 103 are disposed in the area 105 where the sealing member exists. With this structure, the area other than the active matrix area (which determines the screen size) can be minimized.

Since the active matrix area determines the screen size, it cannot readily be made smaller. (The screen should be as large as possible.) Therefore, the structure of FIG. 1 is effective in reducing the size of the entire device.

FIGS. 4A–4D, 5A–5B, and 6 show a manufacturing process of the TFT substrate of an active matrix liquid crystal display device as shown in FIG. 1. More specifically, a manufacturing process of a CMOS structure 441 to be provided in the peripheral driver circuit 102 or 103 shown in FIG. 1 and a p-channel thin-film transistor 440 to be provided in the active matrix area 104.

The step shown in FIG. 4A will be described first. First, a 3,000-Å-thick silicon oxide film as a base film (not shown) is formed on a glass substrate 401 by sputtering (or plasma CVD).

Then, a silicon film as a starting film for forming thin-film transistor active layers is formed in the following manner. First, a 500-Å-thick amorphous silicon film (not shown) is formed by low-pressure thermal CVD. Plasma CVD or sputtering may be used instead of low pressure thermal CVD.

The amorphous silicon film (not shown) is then crystallized by irradiating with laser light. More specifically, the amorphous silicon film is crystallized, i.e., converted into a crystalline silicon film by irradiating with KrF excimer laser light (wavelength: 248 nm). Laser light is shaped into a linear beam, and then applied to the film while scanning it. This enables processing of a large-size substrate.

Alternatively, a crystalline silicon film may be formed by a heat treatment, a rapid thermal annealing (RTA) method, or a combination thereof.

Figure 4A:
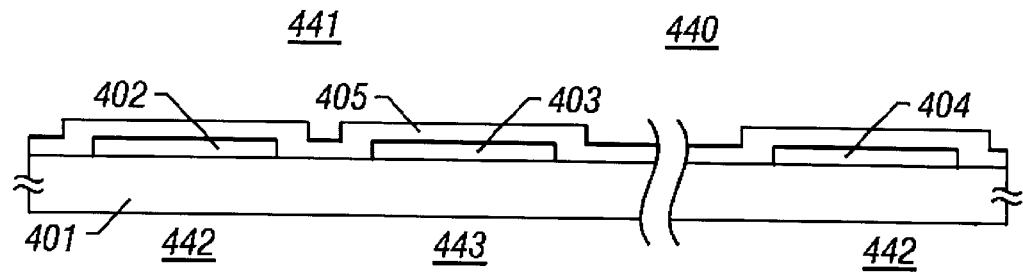
FIGS. 4A–4D show a manufacturing process of thin-film transistors that constitute an active matrix type liquid crystal display device according to a first embodiment of the invention.
Figure 4B:
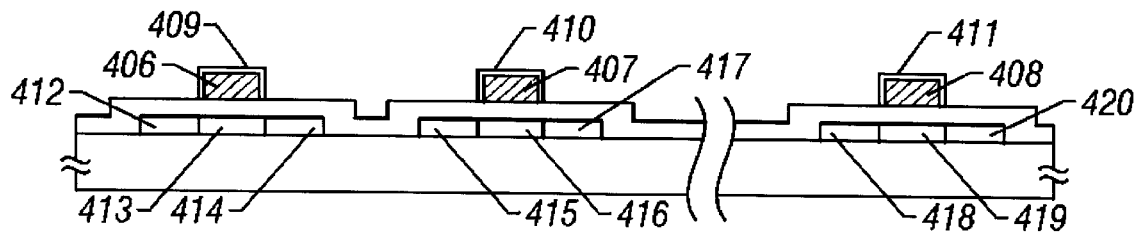

The resulting crystalline silicon film is patterned into active layers 402 to 404 of thin-film transistors (see FIG. 4A). The active layers 402 and 403 respectively belong to p-channel thin-film transistor 442 and an n-channel thin-film transistor 443 that constitute a CMOS circuit to be disposed in the peripheral driver circuit. The active layer 404 belongs to a p-channel thin-film transistor 442 to be disposed in the active matrix circuit. The p-channel thin-film transistor is provided for each pixel.

After the active layers 402 to 404 are formed, a 1,000-Å-thick silicon oxide film 405 to serve as a gate insulating film is formed by plasma CVD. Thus, the state of FIG. 4A is obtained.

Subsequently, a 4,000-Å-thick aluminum film (not shown) as a starting film for forming gate electrodes (and gate lines) is formed by sputtering. Scandium is added to the aluminum film at 0.1 wt % to prevent hillocks and whiskers from occurring in a later heating step or laser light irradiation step. Hillocks and whiskers are horn or needle-like protrusions formed by abnormal growth of aluminum. Yttrium may be used instead of scandium.

Instead of aluminum, tantalum may be used. In more general terms, materials capable of being anodized may be used. Metal materials and silicide materials as well as semiconductor materials doped with an impurity for imparting conductivity at a high concentration may also be used.

After the formation of the aluminum film (not shown), a 100-Å-thick anodic oxide film (not shown) is formed by anodization in an electrolyte that is an ethylene glycol solution containing tartaric acid at 3%. The aluminum film is used as the anode and platinum is used as the cathode.

A resulting anodic oxide film is a dense film. The thickness of the anodic oxide film can be controlled by the application voltage.

Then, after a resist mask (not shown) is formed, the aluminum film is patterned into aluminum patterns 406 to 408 to become gate electrodes. The aluminum patterns 406 to 408 are called a first-layer wiring.

In the active matrix area, the gate electrode 408 is so formed as to extend from a gate line (for example, denoted by numeral 112 in FIG. 1).

Thereafter, anodization is again performed with the aluminum patterns 406 to 408, which will become gate electrodes, as the anodes. The conditions other than the thickness control condition are set the same as those in the previous anodization. In this step, 1,200-Å-thick, dense anodic oxide films 409 to 411 are formed which have effects of preventing short-circuiting between the gate electrodes (gate lines) and other wiring lines through an interlayer insulating film and preventing occurrence of hillocks and whiskers.

After the formation of the gate electrodes, source and drain regions of the respective thin-film transistors are formed by implanting impurity ions into the active layers 402 to 404 in the following manner. First, B ions are implanted while the region to become the n-channel thin-film transistor 443 is masked with a resist. P ions are then implanted while the regions to become the p-channel thin-film transistors 442 are masked with a resist.

The B ion implantation forms p-type impurity regions 412, 414, 418, and 420 of which the regions 412 and 418 are source regions and the regions 414 and 420 are drain regions. Further, channel-forming regions 413 and 419 of the p-channel thin-film transistors 442 are defined.

On the other hand, the P ion implantation forms n-type impurity regions 415 and 417. A channel-forming region 416 of the n-channel thin-film transistor 443 is defined.

After the impurity ions implantation, laser light irradiation is performed to activate the implanted impurity elements and repair damage that was caused by ion impact (annealing). KrF excimer laser light is used.

Subsequently, a 4,000-Å-thick silicon nitride film as a first interlayer insulating film 421 is formed by plasma CVD. Instead of the silicon nitride film, a silicon oxide film or a multi-layer film of a silicon nitride film and a silicon oxide film may be used.

Figure 4C:
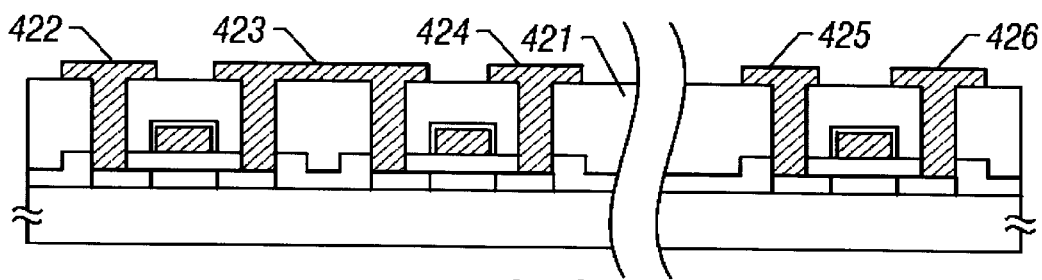

After the formation of the first interlayer insulating film 421, contact holes are formed. FIG. 4C shows source electrodes 422 and 424 of the thin-film transistors of the CMOS circuit to be disposed in the peripheral driver circuit as well as a source electrode 425 of the thin-film transistor to be disposed in the active matrix circuit.

The source electrodes 422 and 424 are so formed as to extend from source lines in the peripheral driver circuit, while the source electrode 425 is so formed as to extend from a source line as denoted by numeral 111 in FIG. 1 which is one of source lines that are arranged in lattice form together with gate lines 112.

A drain electrode 423 is common to the p-channel and n-channel thin-film transistors, and extends from a drain line that wired to have a necessary pattern. A drain electrode 426 will be brought into contact with a pixel electrode.

Each of the above electrodes is a multi-layer film of titanium films and an aluminum film. More specifically, a 3,000-Å-thick aluminum film is interposed between 500-Å-thick titanium films. These films are formed by sputtering.

The above electrodes and wiring lines are called second-layer wiring lines.

Thus, the state of FIG. 4C is obtained. In this state, a 2,000-Å-thick silicon nitride film as a second interlayer insulating film 427 is formed by plasma CVD. Instead of the silicon nitride film, a silicon oxide film or a multi-layer film may be used.

After contact holes are formed, electrodes 428 and 430 are formed. At the same time, a pattern 429 to serve as a light blocking film for the thin-film transistor is formed. The thickness of the electrodes 428 and 430 and the pattern 429, which are called third-layer wiring lines, is set at 2,000 Å.

Each of the electrodes 428 and 430 and the pattern 429 is also a multi-layer film of titanium films and an aluminum film. Alternatively, various types of silicide materials as well as semiconductor materials may be used. However, they are required to have optical characteristics suitable for a light blocking film.

Figure 4D:
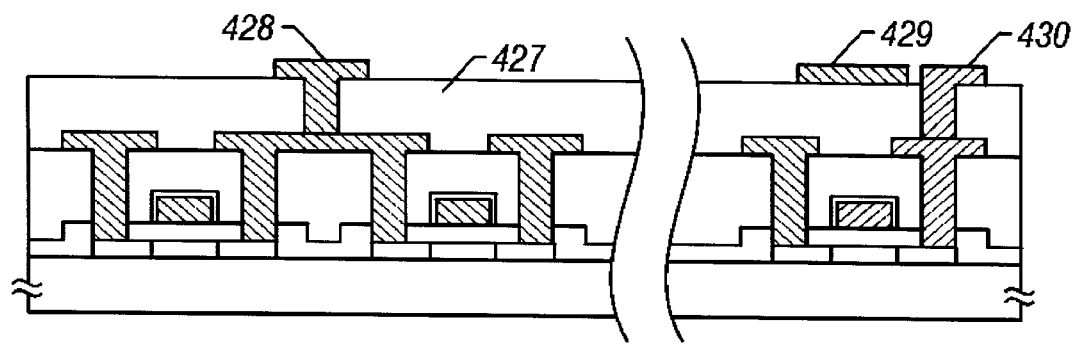

Thus, the state of FIG. 4D is obtained.

Figure 5A:
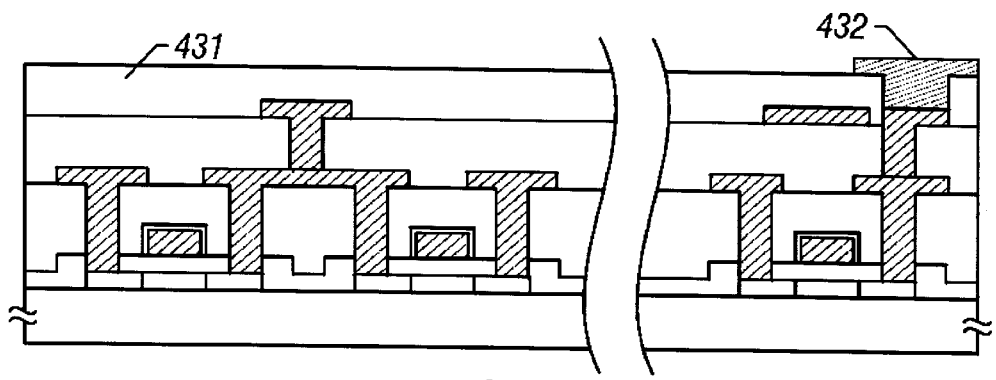
FIGS. 5A–5B show a manufacturing process of thin-film transistors that constitute an active matrix type liquid crystal display device according to a first embodiment of the invention.
Figure 5B:
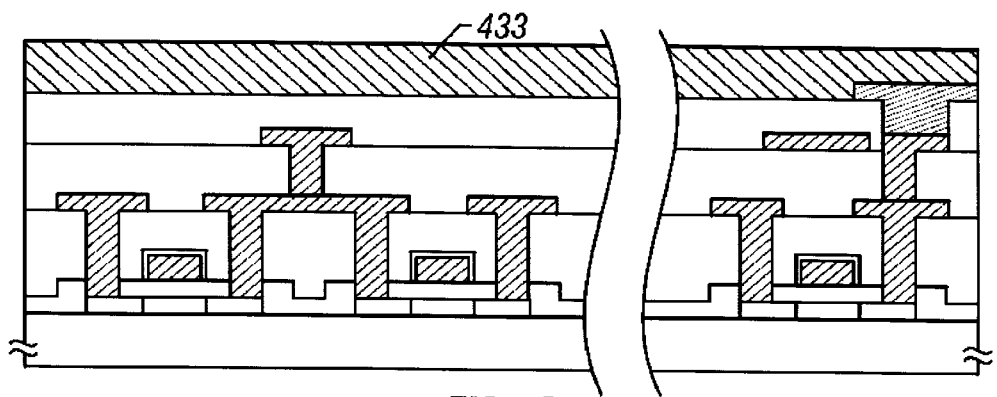

Thereafter, as shown in FIG. 5A, a 2,000-Å-thick third interlayer insulating film 431 is formed. As in the above cases, the third interlayer insulating film 431 is a silicon nitride film formed by plasma CVD. Alternatively, the third interlayer insulating film 431 may be made of a resin material.

After a contact hole is formed, an ITO film as a pixel electrode 432 is formed, to provide the state of FIG. 5A.

Subsequently, a polyimide film as a rubbing film 433 for orientating a liquid crystal is formed by spin coating. Then, known orientation processing is performed (see FIG. 5B).

Figure 6:
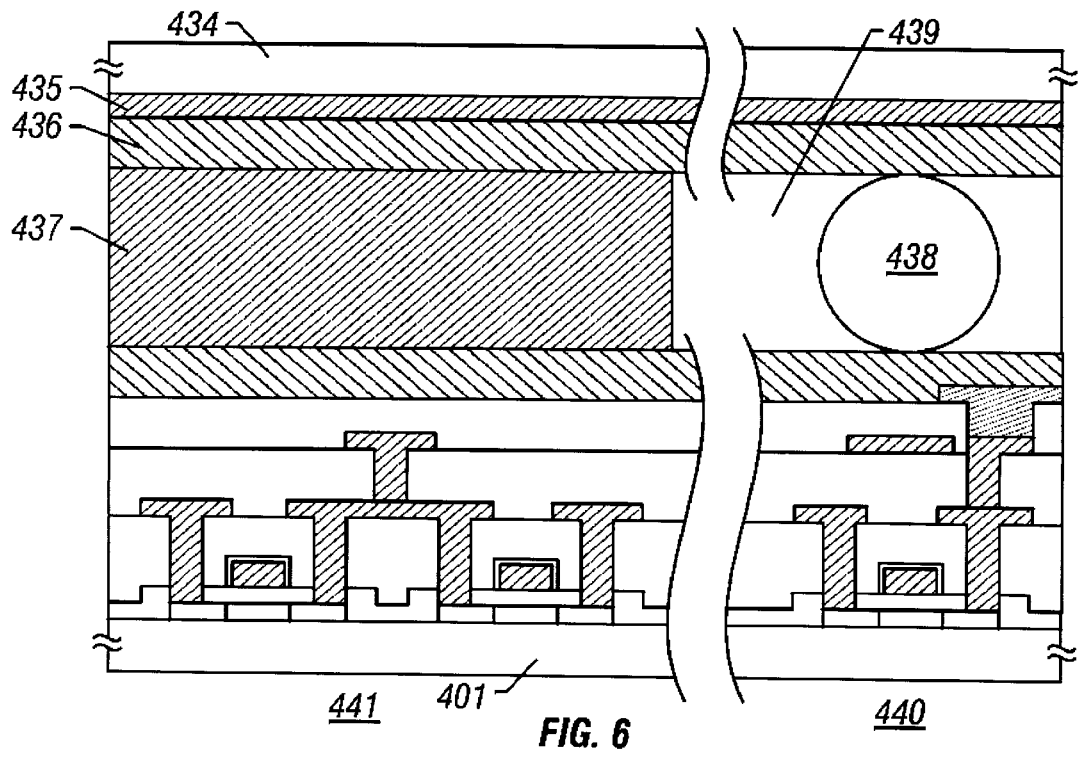
FIG. 6 shows a manufacturing process of thin-film transistors that constitute an active matrix type liquid crystal display device according to a first embodiment of the invention (a sectional view of a liquid crystal panel)

Next, a substrate to be opposed the substrate (denoted by 401 in FIG. 4A) on which the thin-film transistors are arranged is prepared (see FIG. 6).

This substrate is configured such that a base film (not shown) is formed on a glass substrate 434 that is the same as the glass substrate 434, an ITO opposed electrode 435 is formed thereon, and an orientation film 436 is formed thereon.

As shown in FIG. 6, the substrates 434 and 401 are bonded together with spacers 438 interposed therebetween. The bonding is effected by a sealing member 437. A liquid crystal material 439 is injected into the inside space of the sealing member 437.

The sealing member 437 has the following functions:
bonding together the substrates 434 and 401;
sealing the liquid crystal material 439; and
shielding the peripheral driver circuits from light.

The sealing member 437 is made of a resin material containing a pigment for light blocking. For this purpose, various types of resin materials having a light blocking function may be used.

The light blocking function as used herein means a function of providing such light blocking performance as to prevent erroneous or unstable operation of the thin-film transistors constituting the peripheral driver circuits. Therefore, the degree of light blocking depends on the intensity of light that is incident on the liquid crystal panel as well as the operation speed and the mode of operation required for the peripheral driver circuits.

In this embodiment, the peripheral driver circuits are sealed with the sealing member having the light blocking function. This structure can minimizes the area other than the area that functions as the screen.

Further, a black matrix (BM) is not provided in the active matrix area, as described later. Instead, each thin-film transistor in the active matrix circuit is provided with the light blocking film 429 (see FIG. 4D) that is formed at the same time as the third-layer wiring lines.

In this embodiment, instead of using a black matrix, the source line and the gate lines are overlapped with the pixel electrode and the coextending portions are used as a black matrix.

Figure 7:
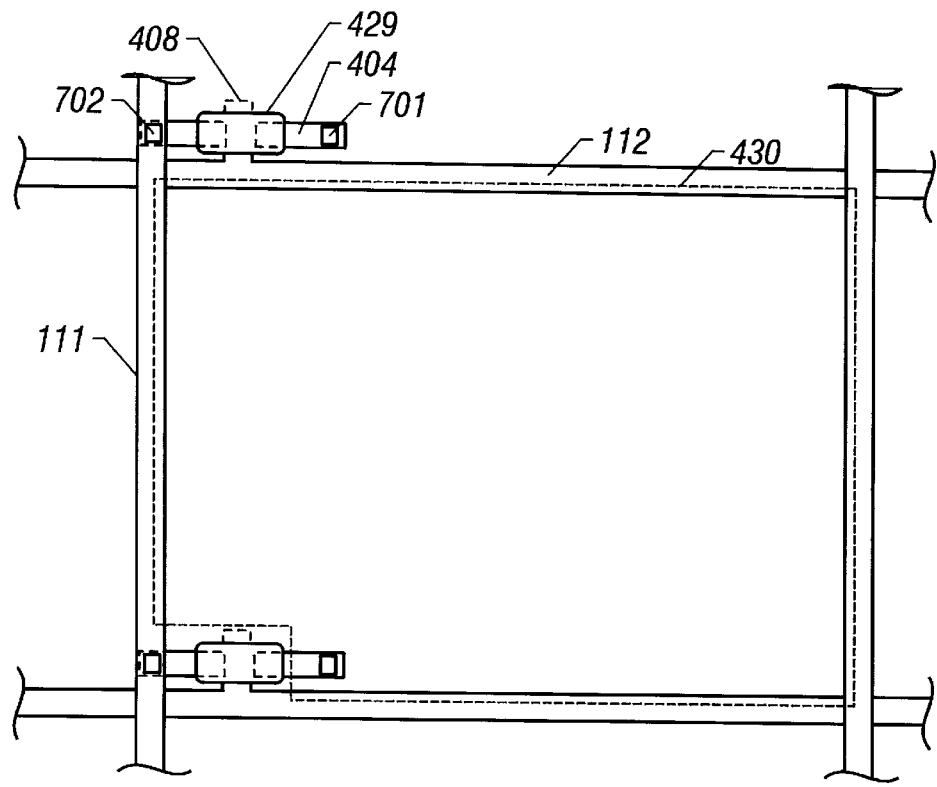
FIG. 7 is a top view showing part of an active matrix area according to the first embodiment.

That is, as shown in a top view of FIG. 7, the pixel electrode 430 is overlapped with the source line 111 and the gate line 112. The coextending portions serve as the black matrix.

In FIG. 7, the same reference numerals as in FIGS. 1 and 4A through 6 indicate the same parts.

In FIG. 7, reference numerals 701 and 702 denote contacts; 404, the active layer of the thin-film transistor; 408, the gate electrode; and 429, the light blocking film shown in FIG. 4D. The light blocking film 429 prevents each thin-film transistor in the active matrix area from being irradiated with light.

Although in this embodiment the p-channel thin-film transistors are arranged in the active matrix circuit, n-channel thin-film transistors may be arranged there.

Embodiment 2

FIGS. 8A to 8E, 9A to 9D, and 10A to 10B show a manufacturing process according to this embodiment. This embodiment is directed to a configuration in which an n-channel thin-film transistor and a p-channel thin-film transistor (not shown) are formed in a peripheral driver circuit 842 and p-channel thin-film transistors are formed in an active matrix circuit 843. In particular, low-concentration impurity regions are formed in the n-channel thin-film transistors, and high-concentration ion impurity regions are formed between a channel-forming region and source/drain regions of the p-channel thin-film transistors.

This configuration can suppress deteriorations in the characteristics of the n-channel thin-film transistors in the peripheral driver circuit 842. Further, in the active matrix circuit 843, a variation in on-current can be reduced.

A manufacturing process will be described below. First, a silicon oxide film as a base film (not shown) is formed on a glass substrate 801 as shown in FIG. 8A.

A 500-Å-thick amorphous silicon film (not shown) is then formed the base film by plasma CVD. The amorphous silicon film is crystallized by irradiating it with laser light, to obtain a crystalline silicon film.

The crystalline silicon film is patterned into active layers 802 and 803 of the thin film transistors. The active layer 802 belongs to an n-channel thin-film transistor of the peripheral driver circuit 842, and the active layer 803 belongs to a p-channel thin-film transistor of the active matrix circuit 843.

Figure 8A:
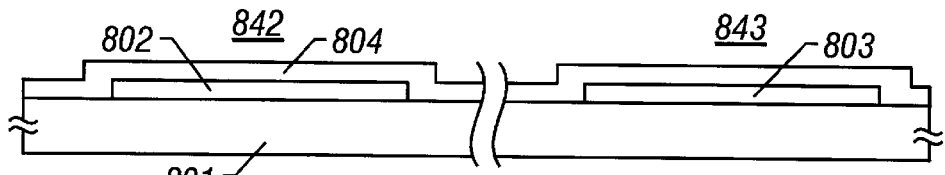
FIGS. 8A–8E show a manufacturing process of thin-film transistors that constitute an active matrix type liquid crystal display device according to a second embodiment of the invention.

Thereafter, a 1,000-Å-thick silicon oxide film as a gate insulating film 804 is formed by plasma CVD, to obtain the state of FIG. 8A.

In this state, a 4,000-Å-thick aluminum film (not shown) to constitute a gate electrode (and a gate line) is formed by sputtering. The aluminum film contains scandium at 0.1 wt %.

Then, a 100-Å-thick, dense anodic oxide film (not shown) is formed by anodization in an electrolyte that is an ethylene glycol solution containing tartaric acid at 3%. This solution is neutralized with aqueous ammonia. This anodic oxide film improves the adhesiveness of resist masks that are formed thereon.

Figure 8B:
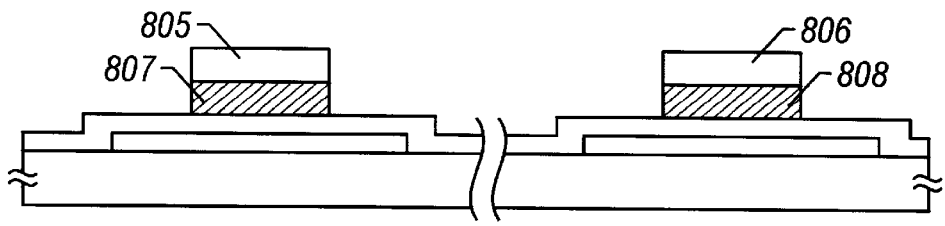
Figure 8C:
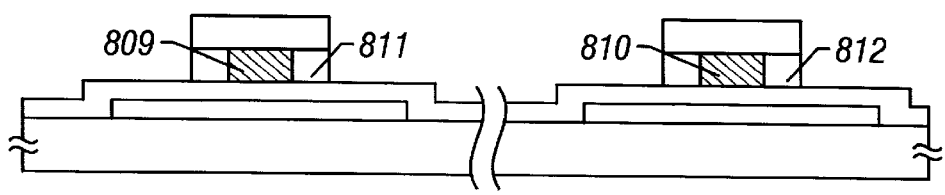

The aluminum film is patterned by using resist masks 805 and 806 into aluminum patterns 807 and 808. Thus, the state of FIG. 8B is obtained.

In this state, anodization is performed with the aluminum patterns 807 and 808 used as the anodes, to form porous anodic oxide members (the term "films" is not appropriate) 811 and 812. The growth distance of the anodic oxide members 811 and 812 is set at 5,000 Å.

The anodization is performed by using an electrolyte that is an aqueous solution containing oxalic acid at 3%.

In this step, because of the existence of the resist masks 805 and 806, anodization proceeds selectively on the side faces of the aluminum patterns 807 and 808. That is, the resist masks 805 and 806 prevents the electrolyte from contacting with the top faces of the aluminum patterns 807 and 808. Structures 809 and 810 will become gate electrodes.

Then, after the resist masks 805 and 806 are removed, dense anodic oxide films are formed by anodization in an electrolyte that is an ethylene glycol solution containing tartaric acid at 3%. This solution is neutralized with aqueous ammonia.

Figure 8D:
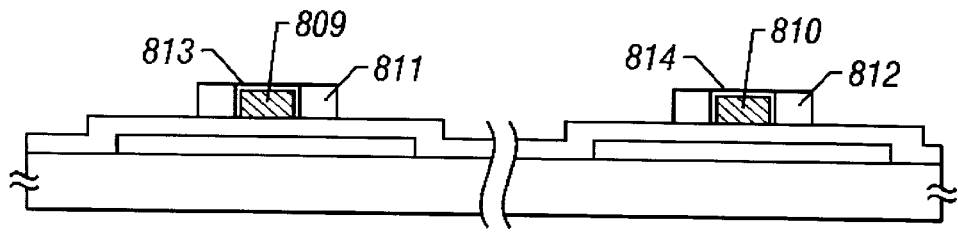
Figure 8E:
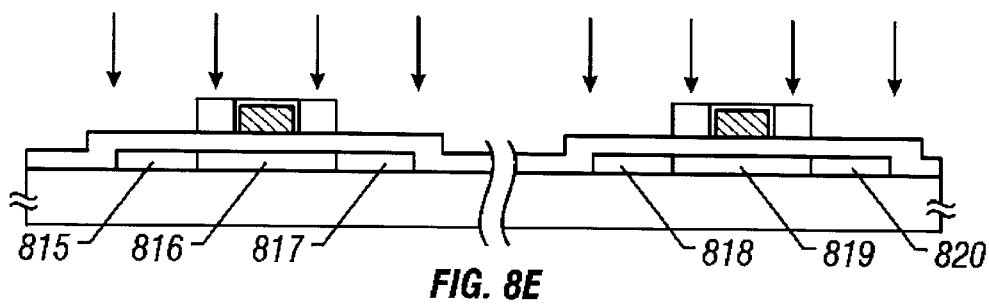

In this step, the electrolyte enters into the porous anodic oxide layers 811 and 812, whereby dense anodic oxide films 813 and 814 are formed as shown in FIG. 8D.

In this step, gate electrodes 809 and 810 are defined, the surface of which are covered with the dense anodic oxide films 813 and 814, respectively. The gate electrodes 809 and 810 and lines extending therefrom constitute a first-layer wiring lines. Thus, the state of FIG. 8D is obtained.

Subsequently, P (phosphorus) ions are implanted from above the entire surface. To form source and drain regions, P ions are implanted at a relatively high concentration (see FIG. 8E). In this step, P ions are implanted in regions 815, 817, 818, and 820, and are not implanted in regions 816 and 819.

Figure 9A:
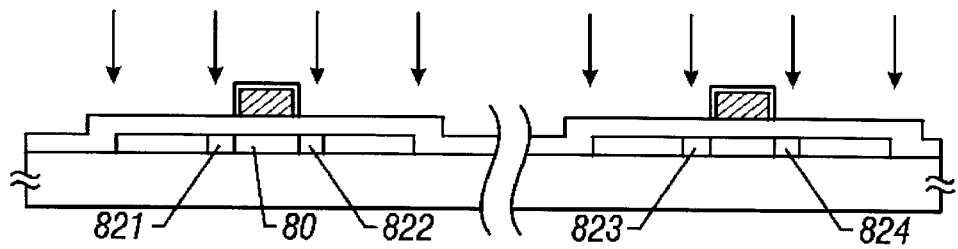
FIGS. 9A–9D show a manufacturing process of thin-film transistors that constitute an active matrix type liquid crystal display device according to a second embodiment of the invention.

Then, the porous anodic oxide layers 811 and 812 are removed to obtain the state of FIG. 9A. In this state, P ions are again implanted at a lower dose than in the previous doping of FIG. 8E. As a result, low-concentration impurity regions 821, 822, 823, and 824 are formed, to define a channel-forming region 80 of the n-channel thin-film transistor (see FIG. 9A).

Then, after the region to become the n-channel thin-film transistor is covered with a resist mask 825, B (boron) ions are implanted. This step is performed under such conditions that regions 81 and 85 become source and drain regions of the p-channel thin-film transistor.

As a result, the regions 81 and 85 become the source and drain regions, while regions 82 and 84 have stronger p-type conductivity than the regions 81 and 85 because of a lower concentration of phosphorus in the regions 81 and 85. That is, more boron atoms are needed to neutralize phosphorus atoms in the regions 81 and 85, as a result of which the regions 82 and 84 exhibit stronger p-type conductivity.

Figure 9B:
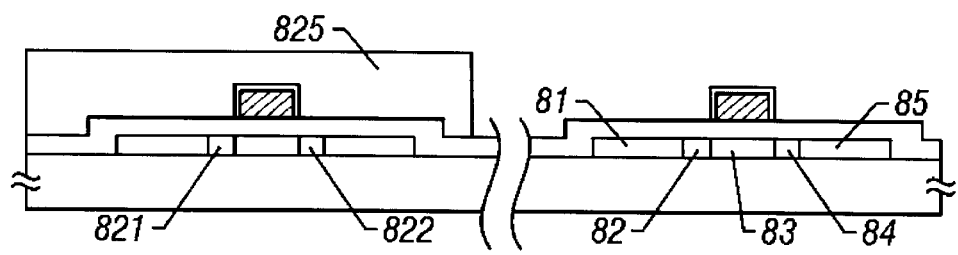
Figure 9C:
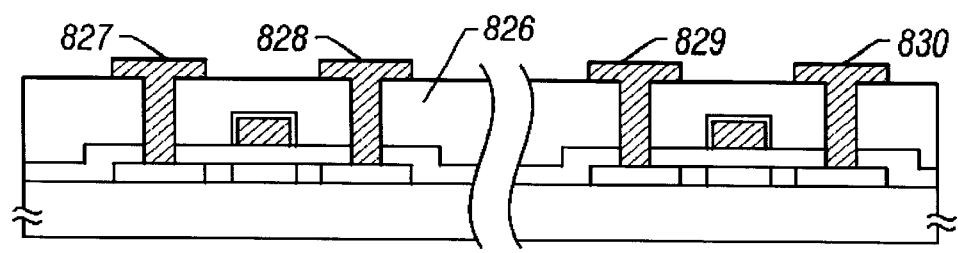
Figure 9D:
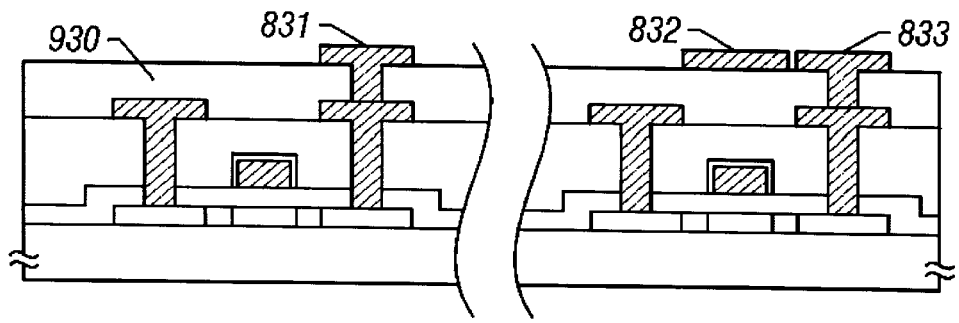

Thus, a channel-forming region 83 of the p-channel thin-film transistor is defined (see FIG. 9B).

After the completion of the impurity ion implantation, the resist mask 825 is removed. Then, laser light irradiation is performed to activate the implanted impurities and repair damage in the semiconductor film caused by ion impact (annealing).

Subsequently, a first interlayer insulating film 826 is formed. After contact holes are formed, second-layer wiring lines (electrodes) 827 to 830 are formed (see FIG. 9C).

Then, a second interlayer insulating film 930 is formed. After contact holes are formed, third-layer wiring lines (electrodes) 831 and 833 are formed. At the same time, a light blocking film 832 for shielding the thin-film transistor in the active matrix circuit 843 from light is formed (see FIG. 9D).

Further, a third interlayer insulating film 86 is formed. After a contact hole is formed, an ITO pixel electrode 834 is formed. A rubbing film 835 is then formed (see FIG. 10A).

Thereafter, an opposed substrate 836 is prepared and bonded to the TFT substrate. An opposed electrode 837 and a rubbing film 838 are formed on the opposed substrate 836.

Figure 10A:
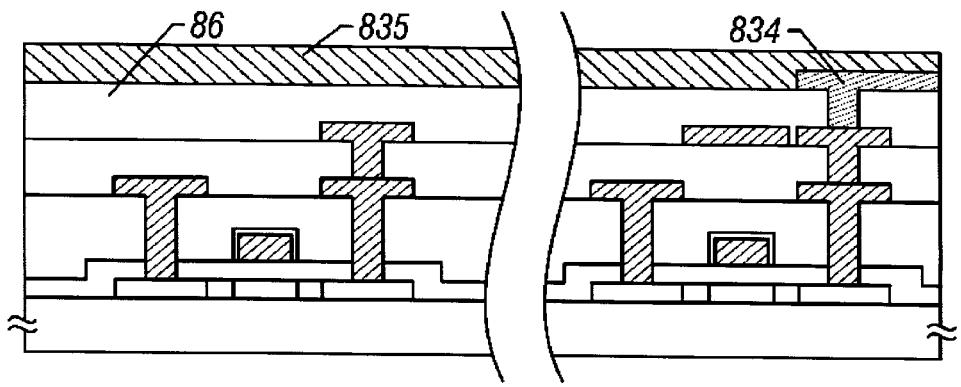
FIG. 10A–10B show a manufacturing process of thin-film transistors that constitute an active matrix type liquid crystal display device according to a second embodiment of the invention (sectional view of a liquid crystal panel)
Figure 10B:
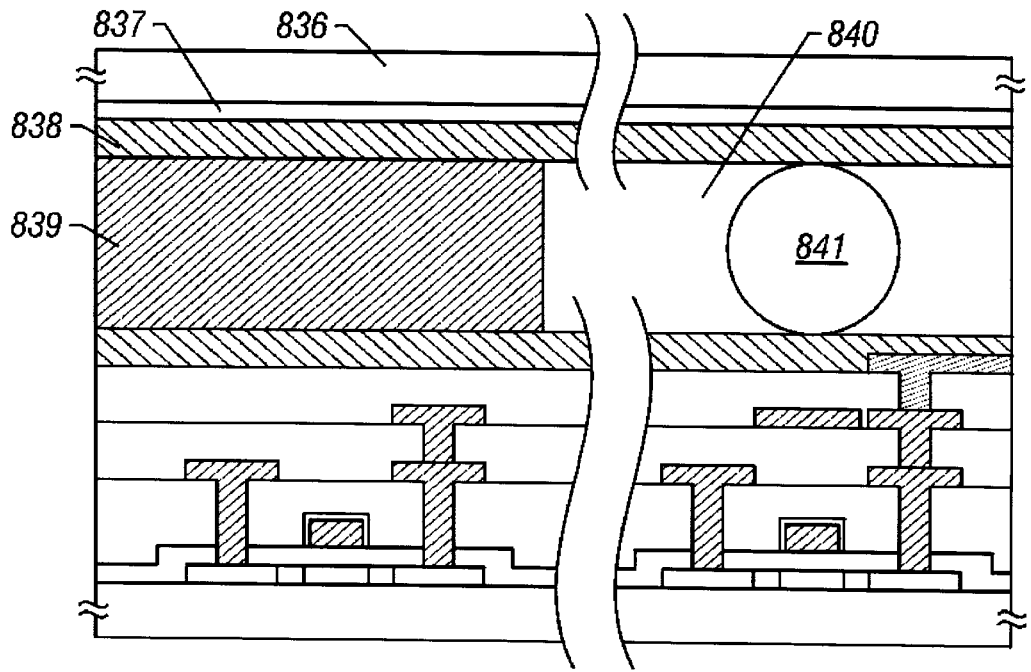

Thus, a liquid crystal cell shown in FIG. 10B is completed. In FIG. 10B, reference numeral 839 denotes a resin member having a light blocking function, which has functions of sealing a liquid crystal, bonding together the substrates, and other functions. In FIG. 10B, reference numerals 840 and 841 denote a liquid crystal material and spacers for determining the cell gap, respectively.

Embodiment 3

This embodiment is characterized in that each pixel of the active matrix area is provided, in an equivalent sense, with a series connection of a plurality of thin-film transistors rather than a single thin-film transistor.

In this configuration, since a divided, small voltage is applied to each thin-film transistor, leak current in an off-state can be reduced.

Further, deteriorations in characteristics can be suppressed, particularly when n-channel thin-film transistors are used.

Embodiment 4

In this embodiment, various electronic devices will be described with reference to FIGS. 11A to 11E as examples of semiconductor devices to which the invention can be applied. Examples of semiconductor devices utilizing the invention are a projector, a (digital) video camera, a (digital) still camera, a head-mount display, a car navigation system, a personal computer, and portable information terminal equipment (a mobile computer, a cellular telephone set, etc.) Further, the invention can be applied to a portable information terminal incorporating a PHS (personal handyphone system), which recently attracts much attention.

FIG. 11A shows a mobile computer, which is constituted of a main body 2001, a camera section 2002, an image receiving section 2003, an operation switch 2004, and a display unit 2005. The invention can be applied to the display unit 2005.

FIG. 11B shows a head-mount display, which is constituted of a main body 2101, display units 2102, and a band section 2103. The invention can be applied to the display unit 2102.

FIG. 11C shows a car navigation system, which is constituted of a main body 2201, a display unit 2202, operation switches 2203, and an antenna 2204. The invention can be applied to the display unit 2202.

FIG. 11D shows a cellular telephone set, which is constituted of a main body 2301, a voice output section 2302, a voice input section 2303, a display unit 2304, operation switches 2305, and an antenna 2306. The invention can be applied to the display unit 2304.

FIG. 11E shows a video camera, which is constituted of a main body 2401, a display unit 2402, a sound input section 2403, operation switches 2404, a battery 2405, and an image receiving section 2406. The invention can be applied to the display unit 2402.

As described above, the invention has a very wide application range; it can be applied to display media of any field.

As described above, according to the invention, the peripheral driver circuits are disposed in the area where the sealing member exists, the sealing member is used as the light blocking member for the peripheral driver circuits, and no black matrix is disposed in the active matrix area. With this configuration, the invention simplifies the configuration of an active matrix liquid crystal display device as well as reduce its entire size.

Further, although transmission type liquid crystal display devices are described in the embodiments of the instant invention, the present invention can be also applied to a reflection type liquid crystal display device.

What is claimed is:

1. A display device comprising:
   a first substrate and a second substrate;
   an active matrix circuit being formed over the first substrate and including at least a first thin film transistor;
   a peripheral driver circuit being formed over the first substrate and including at least a second thin film transistor;
   a first interlayer insulating film being formed over the first and second thin film transistors;
   a second interlayer insulating film being formed over the second interlayer insulating film;
   a light blocking electrode being formed over the first thin film transistor and on the second interlayer insulating film;
   a sealing member formed over the first substrate so as to cover the peripheral driver circuit, the sealing member being capable of light blocking,
   wherein the sealing member comprises a pigment for light blocking,
   wherein the light blocking electrode acts as a light blocking film for the first thin file transistor.

2. A device according to claim 1,
   wherein the active matrix circuit has a plurality of pixels arranged in matrix form, and
   wherein overlapped regions in each of the pixels where source lines and drain lines overlap with a pixel electrode serve as a black matrix.

3. A device according to claim 1 further comprising:
   at least a wiring being connected to a source region or a drain region of the first thin film transistor wherein the wiring comprises one selected from the group consisting of a metal film, a semiconductor film, and a silicide film, and wherein the light blocking electrode comprises the one selected from the group consisting of the metal film, the semiconductor film, and the silicide film.

4. A device according to claim 1,
   wherein each of the first and second substrates is a glass substrate or a quartz substrate.

5. A device according to claim 1,
   wherein the first and second substrates are bonded to each other with the sealing member.

6. A device according to claim 1 further comprising:
   a liquid crystal material being interposed between the first and second substrates,
   wherein the sealing member seals the liquid crystal material.

7. A device according to claim 1,
   wherein the active matrix circuit comprises a plurality of third thin film transistors which are connected in series.

8. A device according to claim 1 further comprising:
   a first electrode being formed on the first interlayer insulating film and being connected to a source region or a drain region of the first thin film transistor;
   a second electrode being formed on the second interlayer insulating film and being connected to the first electrode.

9. An electronic device comprising:
   at least a first substrate and a second substrate;
   a peripheral driver circuit region formed over the first substrate, said peripheral driver circuit region having at least one of a shift register circuit, a NAND circuit, a level shifter circuit or a buffer circuit;
   an active matrix region formed over the first substrate, said active matrix region having at least a pixel;
   at least a first thin film transistor being formed in the pixel in the active matrix region;
   at least a second thin film transistor being formed in the peripheral driver circuit region;
   a first interlayer insulating film being formed over the first and second thin film transistors;
   a second interlayer insulating film being formed over the first interlayer insulating film;
   a light blocking electrode being formed over the first thin film transistor and on the second interlayer insulating film;
   a sealing member formed between the first and second substrates, said sealing member bonding the first and second substrates and covering the peripheral driver circuit region; and
   wherein the sealing member shields the peripheral driver circuit region from a light,
   wherein the sealing member comprises a pigment for light blocking,
   wherein the light blocking electrode acts as a light blocking film for the first thin film transistor.

10. A device according to claim 9,
    wherein the display device does not include a black matrix.

11. A device according to claim 9,
    wherein the shift register circuit comprises at least a clocked inverter and an inverter.

12. A device according to claim 9, wherein the second thin film transistor is a CMOS transistor having an n-channel thin film transistor and a p-channel thin film transistor, wherein the first thin film transistor has at least an active layer, a gate insulating film adjacent to the active layer, a gate electrode adjacent to the gate insulating film, wherein the light blocking electrode is formed over the gate electrode.

13. A device according to claim 9, further comprising image sensing means for constituting a camera, wherein an image obtained by the image sensing means is visualized.

14. A device according to claim 9, further comprising a computing means.

15. A device according to claim 9, wherein the electronic device is a projector.

16. A device according to claim 9 further comprising:

a liquid crystal material being interposed between the first substrate and the second substrate.

17. A device according to claim 9, wherein the active matrix region comprises a plurality of third thin film transistors being connected in series.

18. A device according to claim 9 further comprising:

a first electrode being formed on the first interlayer insulating film and being connected to a source region or a drain region of the first thin film transistor;

a second electrode being formed on the second interlayer insulating film and being connected to the first electrode.

19. A display device comprising:

at least a first substance and a second substrate;

a peripheral driver circuit region formed over the first substrate, said peripheral driver circuit region having at least a shift register circuit, a NAND circuit, a level shifter circuit or a buffer circuit, wherein at least a CMOS transistor is formed in the peripheral driver circuit region, said CMOS transistor having a n-channel thin film transistor and a first p-channel thin film transistor;

an active matrix region formed over the first substrate, said active matrix region having at least a pixel, wherein a second p-channel thin film transistor is formed in the pixel;

a first interlayer insulating film being formed over the CMOS circuit of the peripheral driver circuit region and the second p-channel thin film transistor of the active matrix region;

a second interlayer insulating film being formed over the first interlayer insulating film;

a light blocking electrode being formed over the second p-channel thin film transistor and on the second interlayer insulating film;

a sealing member formed between the first and second substrates, said sealing member bonding the first and second substrates and covering the peripheral driver circuit region; and wherein the sealing member comprises a pigment for light blocking, wherein the sealing member shields the peripheral driver circuit region from light, wherein the light blocking electrode act as a light blocking film for the second p-channel thin film transistor of the matrix region.

20. A device according to claim 19, wherein the display device does not include a black matrix.

21. A device according to claim 19, wherein the shift register circuit comprises at least a clocked inverter and an inverter.

22. A device according to claim 19 wherein, said first p-channel thin film transistor comprises,
a first source region and a first drain region formed over the first substrate,
a first channel forming region formed between the first source and drain regions,
a first gate insulating region formed adjacent to the first source and drain regions and the first channel forming regions,
a first gate electrode formed adjacent to the first gate insulating film, said n-channel thin film transistor comprises,
a third source region and a third drain region formed over the first substrate,
a third channel forming region formed between the third source and drain regions,
a third gate insulating region formed adjacent to the third source and drain regions and the third channel forming region,
a third gate electrode formed adjacent to the third gate insulating film, said second p-channel thin film transistor comprises,
a second source region and a second drain region formed over the first substrate,
a second channel forming region formed between the second source and drain regions,
a second gate insulating region formed adjacent to the second source and drain regions and the second channel forming region,
a second gate electrode formed adjacent to the second gate insulating film,
wherein the light blocking electrode is formed over the second gate electrode.

23. A device according to claim 22 further comprising:

a first pair of high concentration impurity regions formed between the first source and the first channel forming region and between the first channel forming region and the first drain region;

a pair of low concentration impurity regions formed between the third source and the third channel forming region and between the third channel forming region and the third drain region; and a second pair of high concentration impurity regions formed between the second source and the second channel forming region and between said the second channel forming region and the second drain region.

24. A device according to claim 19 further comprising:

a liquid crystal material being interposed between the first substrate and the second substrate.

25. A device according to claim 1, wherein the second thin film transistor is a CMOS transistor having an n-channel thin film transistor and a p-channel thin film transistor, wherein the first thin film transistor has at least an active layer, a gate insulating film adjacent to the active layer, a gate electrode adjacent to the gate insulating film, wherein the light blocking electrode is formed over the gate electrode.

26. A device according to claim 19,
wherein the active matrix region comprises a plurality of third thin film transistors which are connected in series.

27. A device according to claim 19 further comprising:

a first electrode being formed on the first interlayer insulating film and being connected to a second source region or a second drain region of a second p-channel thin film transistor; and a second electrode being formed on the second interlayer insulating film and being connected to the first electrode.

* * * * *